United States Patent
Kononenko et al.

(10) Patent No.: US 8,657,031 B2
(45) Date of Patent: Feb. 25, 2014

(54) UNIVERSAL CONTROL MODULE

(75) Inventors: George Kononenko, Nottingham, MD (US); Zollie W. Privett, Baltimore, MD (US)

(73) Assignee: Black & Decker Inc., Newark, DE (US)

(*) Notice: Subject to any disclaimer, the term of this patent is extended or adjusted under 35 U.S.C. 154(b) by 1805 days.

(21) Appl. No.: 11/441,339

(22) Filed: May 26, 2006

(65) Prior Publication Data
US 2007/0079980 A1 Apr. 12, 2007

Related U.S. Application Data

(60) Provisional application No. 60/726,011, filed on Oct. 12, 2005.

(51) Int. Cl.
*B25D 11/00* (2006.01)

(52) U.S. Cl.
USPC ........... 173/217; 173/176; 173/178; 361/704; 361/715; 361/719; 361/720; 361/721; 361/728; 361/742; 361/752; 361/600; 439/76.1; 439/79; 439/620.1; 439/620.15; 439/660; 439/686; 439/687; 439/695; 439/696

(58) Field of Classification Search
USPC ........ 173/217, 7, 176, 178, 48; 361/689, 690, 361/715, 728, 704, 719, 720, 721, 742, 752, 361/600; 318/257; 439/76.1, 79, 620.1, 439/620.15, 660, 686, 687, 695, 696, 439/620.01
See application file for complete search history.

(56) References Cited

U.S. PATENT DOCUMENTS

| | | | | |
|---|---|---|---|---|
| 3,447,034 A * | 5/1969 | Smith | ............... | 361/236 |
| 3,530,319 A * | 9/1970 | Larkin | ............... | 310/50 |
| 3,911,327 A * | 10/1975 | Murari et al. | ............... | 361/718 |
| 4,292,571 A * | 9/1981 | Cuneo | ............... | 318/17 |
| 4,348,603 A * | 9/1982 | Huber | ............... | 310/50 |
| 4,540,318 A * | 9/1985 | Hornung et al. | ............... | 408/9 |
| 5,375,040 A * | 12/1994 | Cooper et al. | ............... | 361/730 |
| 5,740,001 A * | 4/1998 | Flachslaender et al. | ............... | 361/93.1 |
| 5,926,373 A * | 7/1999 | Stevens | ............... | 361/704 |
| 6,049,043 A * | 4/2000 | Tonejc | ............... | 174/250 |
| 6,307,734 B1 * | 10/2001 | Bruvelaitis et al. | ............... | 361/513 |
| 6,516,896 B1 * | 2/2003 | Bookshar et al. | ............... | 173/1 |
| 6,583,988 B1 * | 6/2003 | Lyons et al. | ............... | 361/719 |
| 6,731,503 B2 * | 5/2004 | Privett et al. | ............... | 361/704 |
| 6,967,849 B1 * | 11/2005 | Hwang et al. | ............... | 361/760 |
| 6,974,061 B2 * | 12/2005 | Adams et al. | ............... | 227/2 |
| 7,006,355 B2 * | 2/2006 | Wakabayashi et al. | ............... | 361/728 |
| 7,102,303 B2 * | 9/2006 | Brotto | ............... | 318/53 |
| 7,112,934 B2 * | 9/2006 | Gilmore | ............... | 318/432 |
| 7,233,495 B2 * | 6/2007 | Tomikawa et al. | ............... | 361/719 |
| 7,641,518 B2 * | 1/2010 | Lee et al. | ............... | 439/660 |
| 2004/0112616 A1 * | 6/2004 | Broghammer et al. | ............... | 173/217 |

FOREIGN PATENT DOCUMENTS

| EP | 1422984 A2 * | 5/2004 |
|---|---|---|
| EP | 1737122 A2 * | 12/2006 |
| EP | 1777792 A2 * | 4/2007 |

\* cited by examiner

*Primary Examiner* — Michelle Lopez
(74) *Attorney, Agent, or Firm* — Amir Rohani; Adan Ayala

(57) ABSTRACT

The universal control module is designed for controlling the operation of a plurality of motors and/or configured for a plurality of different motor applications. In an example, the control module is configurable within a housing of a power tool. The control module includes a top cover, a bottom cover and a printed circuit board (PCB) with control components thereon. The control module includes a spacer configured between the top and bottom covers and attached to the PCB for providing tolerances for the control components during a soldering process to fixedly attach the control components to the PCB.

17 Claims, 10 Drawing Sheets

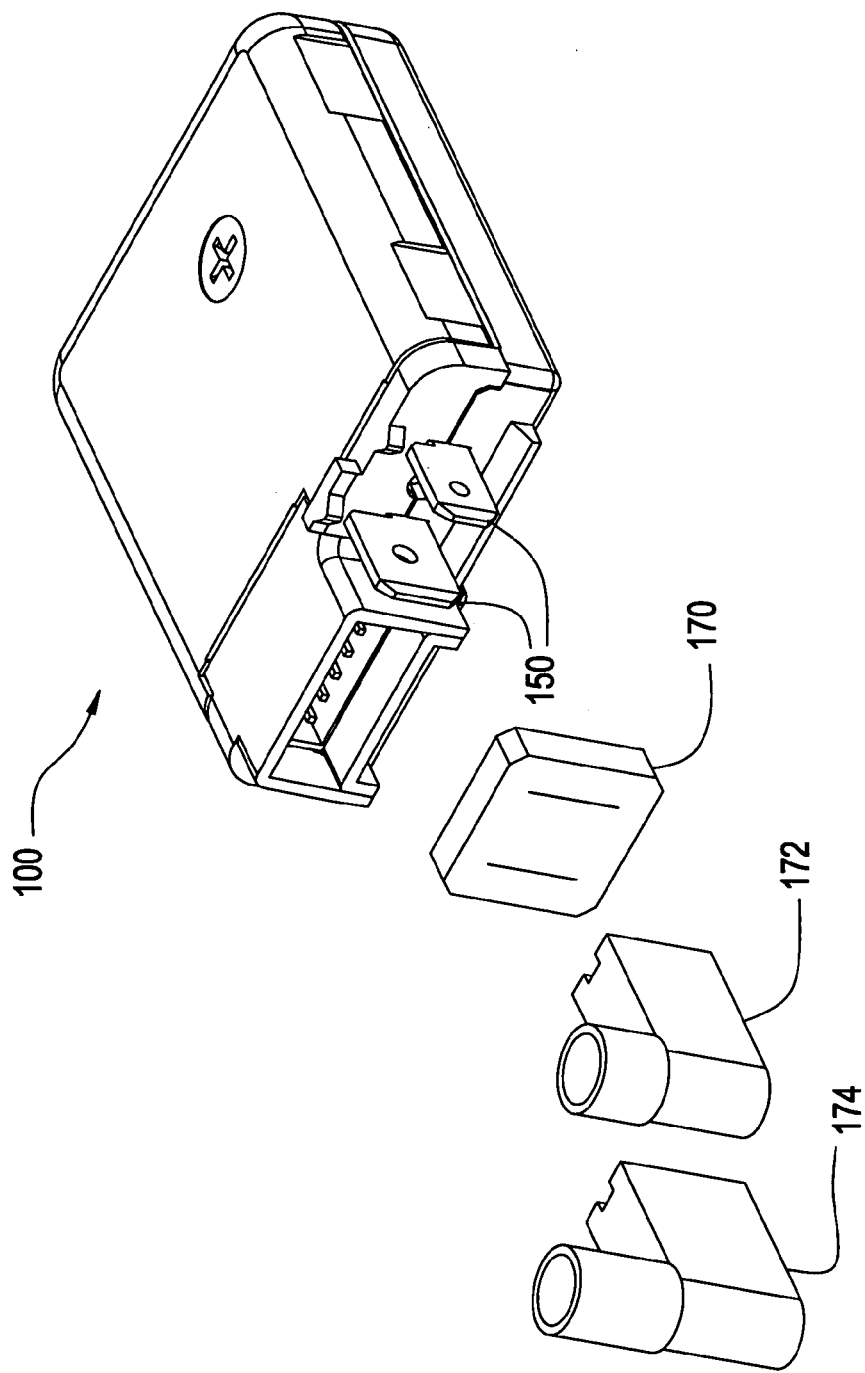

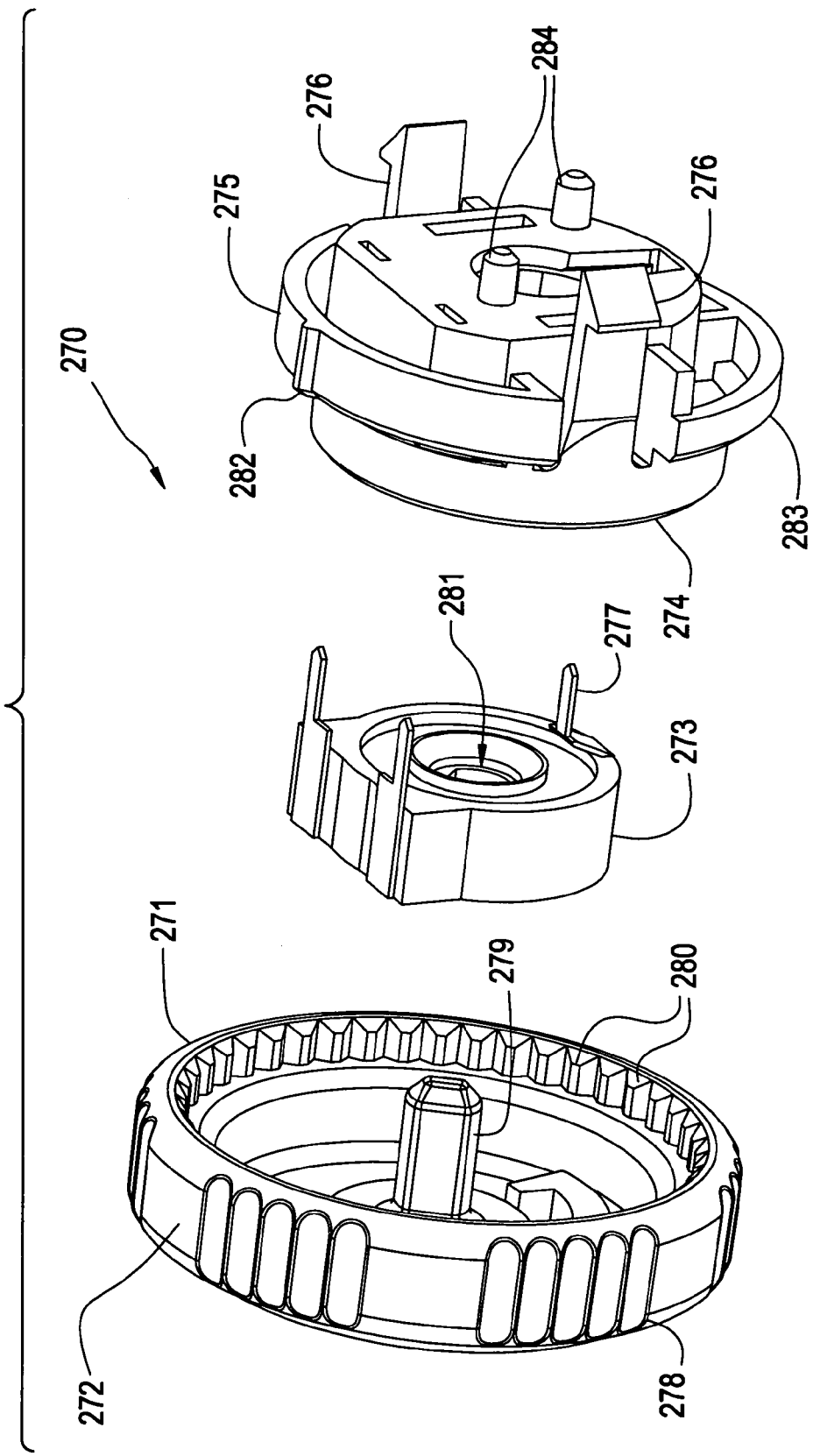

250 # UNIVERSAL CONTROL MODULE

PRIORITY STATEMENT

This application claims the benefit under 35 U.S.C. §119(e) to U.S. Provisional Patent Application Ser. No. 60/726,011, filed Oct. 12, 2005 to Samuel G. WOODS et al. and entitled "UNIVERSAL CONTROL MODULE", the entire contents of which are hereby incorporated by reference herein.

BACKGROUND

1. Field of the Invention

An example embodiment of the present invention in general relates to a universal control module for controlling the operation of a motor.

2. Description of the Related Art

Typically, motors are controlled by dedicated analog or digital circuitry controlling the motor for a given application. For example, a dedicated circuit may be required to control a given motor utilized in a power saw application, while another dedicated circuit may be required to control a different motor utilized in a drill application. The dedicated analog or digital control circuit is typically constructed of different components. These components often have differing values, tolerances and/or control software to create a unique operational characteristic profile for a given motor and/or given motor application.

SUMMARY

An example embodiment of the present invention is directed to a universal control module designed for controlling the operation of a plurality of motors and/or configured for a plurality of different motor applications. In an example, the control module is configurable within a housing of a power tool. The control module includes a top cover, a bottom cover and a printed circuit board (PCB) with control components thereon. The control module includes a spacer configured between the top and bottom covers for providing tolerances for the control components.

Another example embodiment of the present invention is directed to a power tool. The power tool includes a tool housing, tool motor, tool-working accessory powered by the tool motor and a control module for controlling tool motor operation. The control module includes a top cover, a bottom cover, a printed circuit board (PCB) with control components thereon, and a spacer configured between the top and bottom covers for providing tolerances for the control components.

Another example embodiment of the present invention is directed to a control module assembly within a housing of a power tool for controlling operation of a motor of the tool. The assembly includes a control module having a top cover, a bottom cover, a PCB with control components thereon, and a spacer configurable between the top and bottom covers for providing tolerances for the control components. The assembly includes an auxiliary board in proximate relationship to the control module within the tool housing.

Another example embodiment of the present invention is directed to an auxiliary circuit board assembly for a control module that is configurable within a housing of a power tool to control operation of a motor of the tool. The assembly includes an auxiliary board in proximate relationship to the control module within the tool housing, and a pick-up coil assembly attached to the auxiliary board for sensing speed of a motor of the power tool. The assembly includes a variable speed dial wheel attached to the auxiliary board for adjusting speed of the tool motor.

Another example embodiment of the present invention is directed to a pick-up coil assembly arranged on a circuit board connected to a control module. The control module is configurable within a housing of a power tool for controlling operation of a motor of the tool. The pick-up coil assembly includes a pick-up coil for sensing speed of the tool motor, a shroud supporting the pick-up coil, and potting material within the shroud that encloses the pick-up coil. The pick-up coil includes a plurality of leads extending through the potting material and shroud for connection to the auxiliary board.

Another example embodiment of the present invention is directed to a variable speed dial wheel for adjusting speed of a motor of a power tool. The dial wheel is arranged on a circuit board that is connected to a control module. The control module is arranged within a housing of the power tool for controlling operation of the tool motor. The dial wheel includes a rotatable knob, a potentiometer operatively connected to the knob, and a potentiometer cup for supporting the potentiometer.

Another example embodiment of the present invention is directed to a control module configurable within a housing of a power tool. The control module includes a top cover, a bottom cover and a printed circuit board (PCB) with control components thereon. Potting material is provided within the top and bottom covers so as to seal the PCB and control components thereon. The control module includes a spacer configured between the top and bottom covers for providing tolerances for the control components.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the example embodiments of the present invention.

FIG. 5 is a perspective view of the control module to illustrate insulation between the power tabs and mating terminal connectors of the power tool.

FIG. 8 is an exploded isometric view illustrating the constituent components of the variable speed dial wheel in accordance with an example embodiment of the present invention.

DETAILED DESCRIPTION OF THE EXAMPLE EMBODIMENTS

Example embodiments of the present invention are now described with reference to the figures. As illustrated in the figures, sizes of structures and/or portions of structures may be exaggerated relative to other structures or portions for illustrative purposes only and thus are provided merely to illustrate general structures in accordance with the example embodiments of the present invention.

Furthermore, various aspects of the example embodiments may be described with reference to a structure or a portion being formed on other structures, portions, or both. For example, a reference to a structure being formed "on" or "above" another structure or portion contemplates that additional structures, portions or both may intervene there between. References to a structure or a portion being formed "on" another structure or portion without an intervening structure or portion may be described herein as being formed "directly on" the structure or portion.

Additionally, relative terms such as "on" or "above" are used to describe one structure or portion's relationship to another structure or portion as illustrated in the figures. Further, relative terms such as "on" or "above" are intended to encompass different orientations of the control module in addition to the orientation depicted in the figures. For example, if a component or assembly in the figures is turned over, a structure or portion described as "above" other structures or portions would be oriented "below" the other structures or portions. Likewise, if a component or assembly in the figures is rotated along an axis, a structure or portion described as "above" other structures or portions would be oriented "next to", "left of" or "right of" the other structures or portions.

Figure 1:
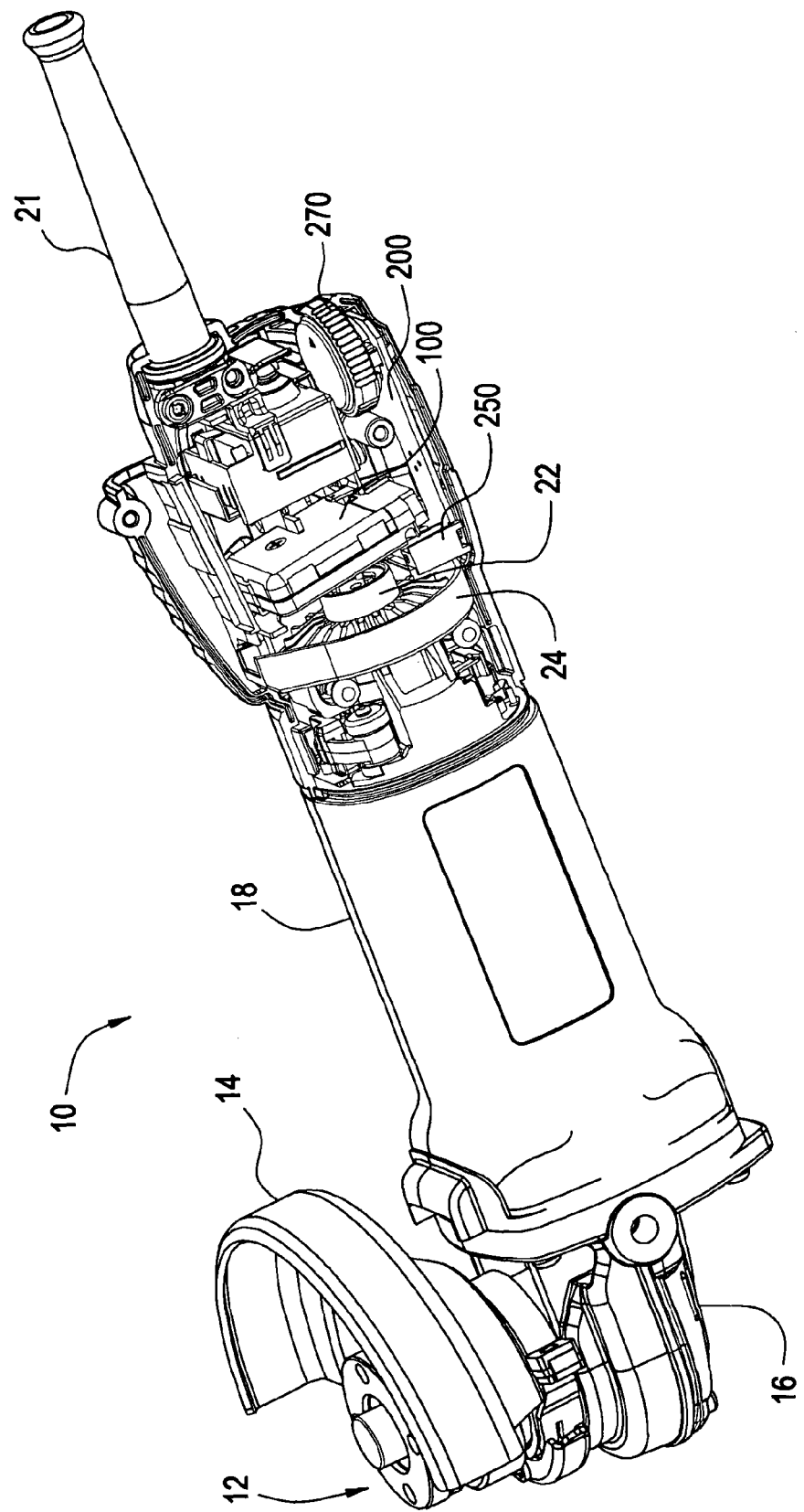
FIG. 1 is a partial plan view of a power tool illustrating the control module within the tool housing, in accordance with an example embodiment of the present invention.

FIG. 1 is a partial plan view of a power tool illustrating a control module within a housing of the tool, in accordance with an example embodiment of the present invention. Referring to FIG. 1, power tool 10 is shown embodied as a rotary, corded power tool 10, it being understood that the example embodiments are directed to power tools other than rotary, corded power tools. In the example of FIG. 1, power tool 10 is shown as an angle grinder powered by AC line power via a power cord 21. The angle grinder 10 includes a knurled clamp nut 12 within accessory guard 14 for receiving a tool-working accessory powered by the tool motor. In this example, the tool-working accessory may be a rotary accessory such as flywheel (not shown). The flywheel is attachable via a spindle to gear case 16 that is secured to tool housing 18.

Tool housing 18 is shown with part of the outer shell removed, so as to illustrate a universal control module 100 ('control module') in proximate relationship to a magnetic collar 22 and a commutator ring 24 of a motor armature. The control module 100 is designed for controlling the operation of a plurality of motors and/or configured for a plurality of different motor applications (e.g. different power tools).

Additionally in FIG. 1, there is shown an auxiliary board 200 supporting a pick-up coil assembly 250 and a variable speed dial wheel 270. As part of an assembly connected to the control module 100 within the power tool 10, the auxiliary board 200 may be included within the tool housing 18. One function of the auxiliary board 200 is to place components that previously had been directly attached to the control module 100 or built into the control module 100 thereon, so as to enable the designer to spread out components within the tool housing 18 and better utilize this available space. The pick-up coil assembly 250 is attachable to the auxiliary board 200 and configured to detect motor speed. The variable speed dial wheel 270 is operable by the user in order to set and/or change to the desired motor speed.

Figure 2:
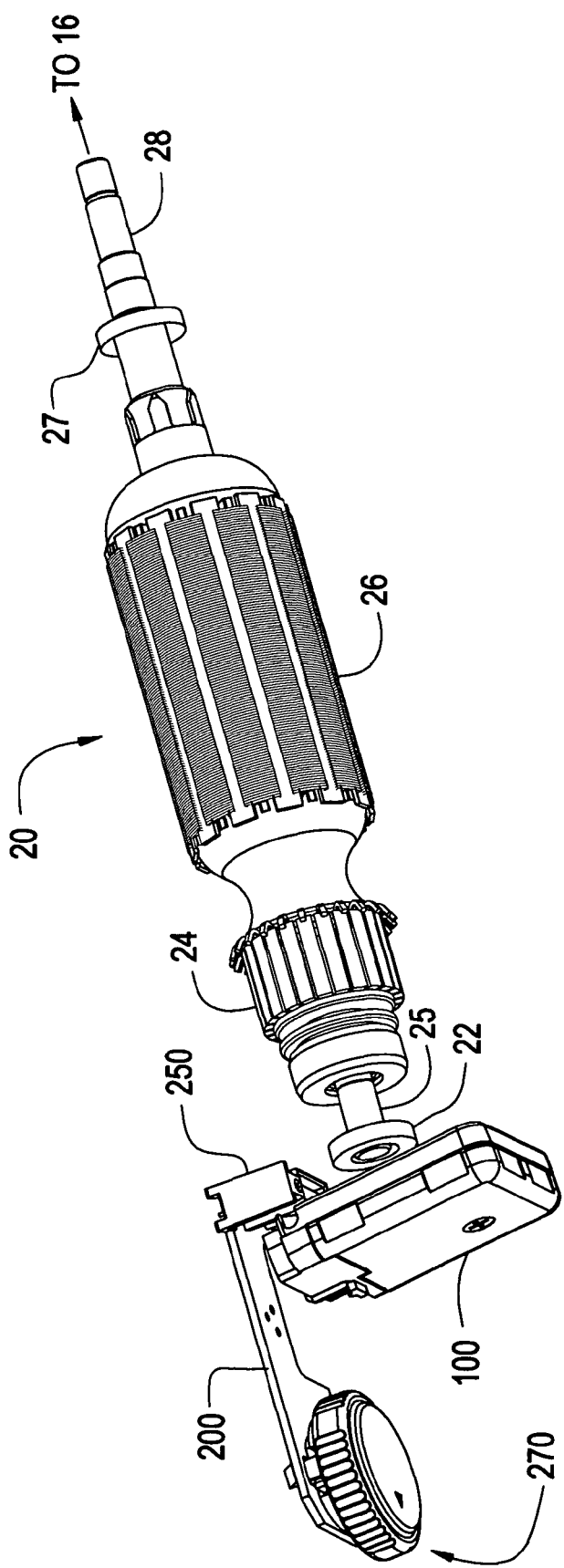
FIG. 2 is an isometric view of selected components of the tool motor within the power tool to illustrate the relation of the control module, pick-up coil, auxiliary board and speed dial, in accordance with an example embodiment of the present invention.

FIG. 2 is an isometric view of selected components of the tool motor within the power tool to illustrate the relation of the control module, pick-up coil assembly, auxiliary board and speed dial, in accordance with an example embodiment of the present invention. FIG. 2 illustrates the relationship between the auxiliary board 200 and its components (pick-up coil assembly 250 and speed dial 270), the control module 100 and the tool motor 20. In an example, the auxiliary board 200, pick-up coil assembly 250 and dial wheel 270 may be collectively referred to as an 'auxiliary circuit board assembly'. The auxiliary circuit board assembly is attached to the control module 100 of FIG. 1, for example, with the control module being adapted to control operation of the tool motor.

The tool motor 20 includes the magnetic collar 22 attachable via ball bearing 25 to the commutator ring 24 of the motor armature 26. The motor 20's output is translated to the gear case 16 via ball bearing 27 and spindle 28. Multiple magnets may be provided on the magnetic collar 22 of the motor armature 26. As the armature 26 rotates, this creates a magnetic field between the magnets that is picked up by the pick-up coil assembly 250 in order to give an accurate reading of motor speed.

The auxiliary board 100 may also include the variable speed dial wheel 270, which acts as a potentiometer as is known in the art. As to be described in more detail hereafter, a portion of the dial wheel 270 may include a plurality of rigid detents that sit on points of a leaf spring, so as to provide aural feedback to the user. In an example, the detents contact the leaf spring to provide a tactile feedback to the user. This also serves to maintain the dial wheel 270 for moving during any tool vibration. Additionally, the use of detents may prevent the user from inadvertently changing speed, providing a readily discernible tactile feedback to the user.

Figure 3:
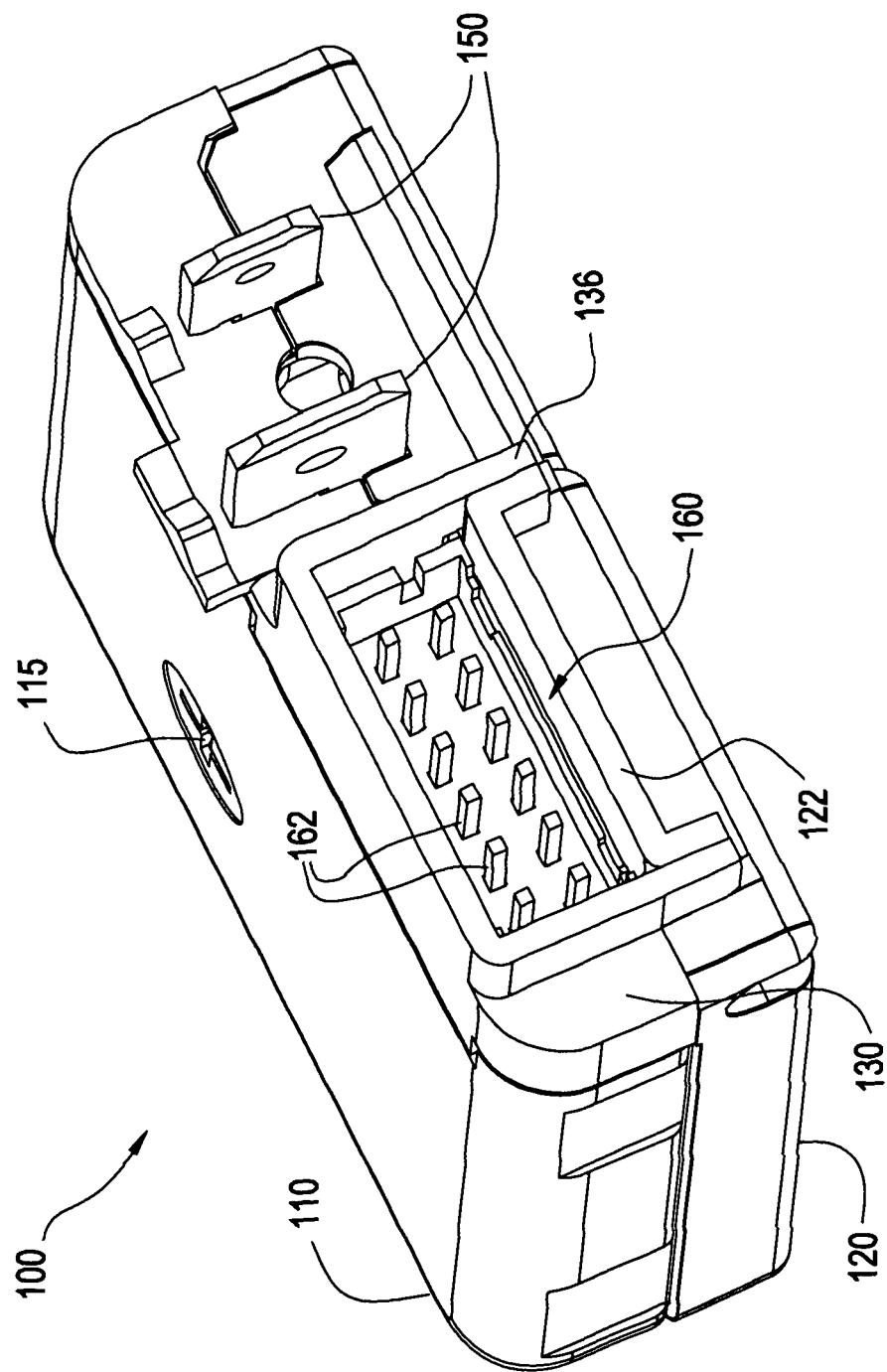
FIG. 3 is an isometric view of the control module in accordance with an example embodiment of the present invention.

FIG. 3 is an isometric view of the control module 100 in accordance with an example embodiment of the present invention. Referring to FIG. 3, the control module 100 includes a top cover 110, a bottom cover 120, a spacer 130 and a printed circuit board 140 (not shown in FIG. 3). In one example, the top cover 100 may be made of a material that provides heat sinking for active power components within the control module 100, and may be cast for that function, for example. The bottom cover 120 may be configured to support control module 100 interior components and to permit potting so as to create a sealed enclosure. Additionally, the bottom cover 120 provides an area of electrical insulation for an active power device within the control module 100.

The spacer 130 may be configured to hold through-hole electronic components within the control module 100 in place, such as during assembly of the control module 100. The control module 100 also may include a fastener 115 (e.g., a screw) that fastens the top cover 110 to a nut (not shown) within the module 100. The fastener 115 may be fastened to an active power device within control module 100.

The control module also includes a pair of quick-connect power tabs 150 and an input/output connector 160 connected to the printed circuit board 140. The quick connect power tabs 150 are sequenced to the control module 100 and may be of a different size and different length to prevent improper connection to other components, for example. In an example, the input/output connector 160 may be configured in a 12-pin arrangement, in which four (4) pins 162 are empty and not used (to provide spacing), five (5) of the pins 162 may be input/output pins, one (1) pin 162 may be a hot-wire pin and one (1) pin 162 may be a circuit ground/neutral pin. This is merely one terminal pin arrangement for input/output connector 160; other arrangements are foreseeable to the skilled artisan in accordance with the example embodiments herein.

Figure 4A:
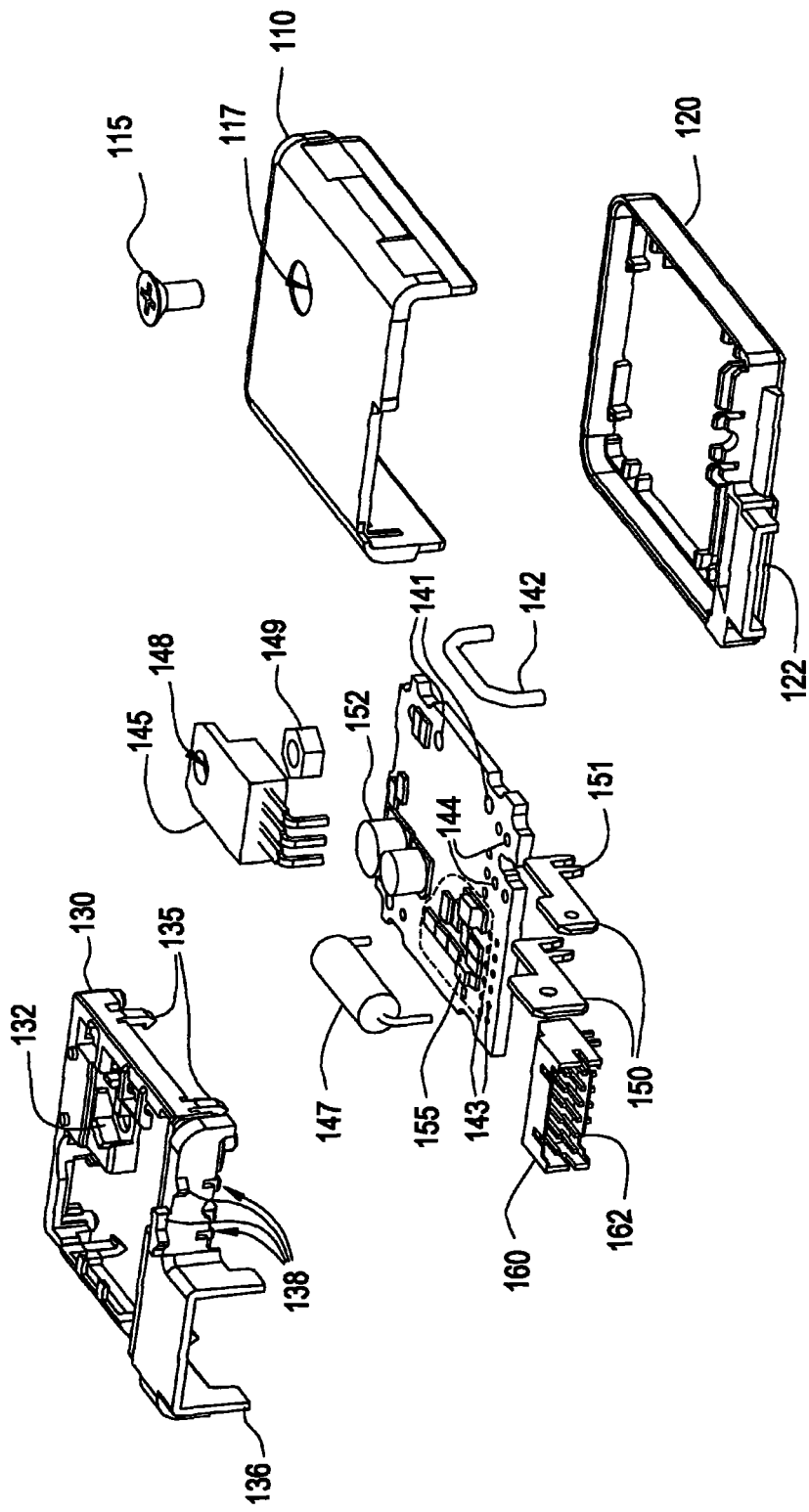
FIG. 4A is an exploded view illustrating constituent components on a printed circuit board (PCB) of the control module in accordance with an example embodiment of the present invention.

FIG. 4A is an exploded view illustrating constituent components on a printed circuit board (PCB) of the control module in accordance with an example embodiment of the present invention. Referring to FIG. 4A, the PCB 140 may include multiple components on both sides of the PCB 140, such as a power resistor 142, an active power device 145, a shunt 147, electrolytic capacitors 152 and other electronic components 155 such as diodes for example. In an example, the active power device may be embodied as a triac 145. A triac is a three terminal semiconductor for controlling current in either direction, as is known.

FIG. 4A illustrates the quick-connect power tabs 150, the input/output connector 160 and the relation of these components to the other active components on PCB 140. The power tabs 150 include legs 151 for snap-fit engagement to corresponding alignment holes 144 of PCB 140. Terminal pins 162 are connectable to PCB 140 via alignment holes 143, as shown in FIG. 4A.

Figure 4B:
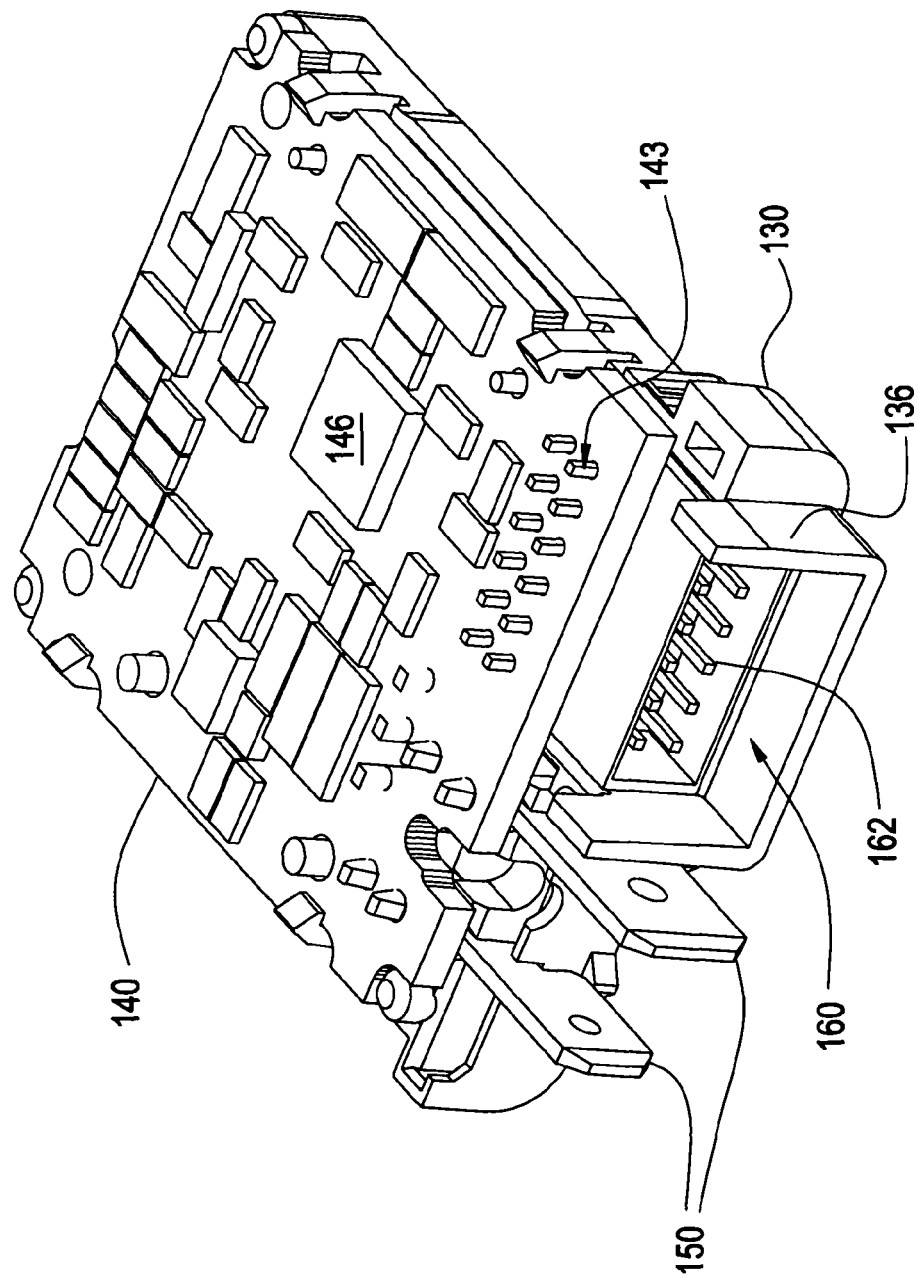
FIG. 4B is an exploded view illustrating constituent components on an underside of the PCB in accordance with an example embodiment of the present invention.

FIG. 4B is an exploded view illustrating constituent components on an underside of the PCB in accordance with an example embodiment of the present invention. FIG. 4B illustrates the terminal pins 162 insertion through the alignment holes 143, in addition to a plurality of electronic components thereon including a microcontroller 146. Microcontroller 146 may include program ROM (alterable ROM) such as flash memory, a CPU core such as a microprocessor, on-board peripherals, and non-volatile memory such as static random access memory (SRAM) on a single chip construction, for example.

The non-volatile memory is adapted to retain stored information even when not powered. Examples of non-volatile memory include RAM (dynamic RAM (DRAM), SRAM, synchronous DRAM (SDRAM), video RAM (VRAM), etc.), magnetic and optical-based memory. Types of alterable solid-state ROM may include Erasable Programmable Read-Only Memory (EPROM) and Electrically Erasable Programmable Read-Only Memory (EEPROM). EPROM can be erased by exposure to ultraviolet light then rewritten via an EPROM programmer, and is identifiable by a circular 'window' in the top that allows the UV light to enter. EEPROM such as Flash memory allows the entire ROM (or selected banks of the ROM) to be electrically erased (flashed back to zero) then written to without taking the banks out of the computing device.

In an example, the microcontroller 146 may be one of the ATMEL AVR® 8-bit RISC microcontrollers, such as the ATmega8 flash microcontroller with 8-Kbyte self-programming Flash Program Memory. However the module 100's intelligent electronic control device is not limited to the example microcontroller 146, and could be embodied in hardware and/or software as another microprocessor or an analog circuit, a digital signal processor or by one or more digital ICs such as application specific integrated circuits (ASICs), for example.

The top cover 110 may be made of a suitable material having good heat transfer properties, such as a metal. In an example, the top cover 110 may be made of a metal material such as copper, aluminum, stainless steel, zinc (ZA8), zinc aluminum alloy, or any similar metal which has attractive thermal heat transfer properties, and/or which may be easily cast as a thin-walled, compact and small top cover 110. As discussed above, the top cover 110 acts as a heat sink for the active components such as the power resistor 142, triac 145 and/or shunt 147, and may be cast for that function, for example.

The fastener 115 fastens the top cover 110 to a nut 149 within the control module 100. The fastener 117 may be composed of a material that facilitates heat transfer, such as any of the metals noted above for top cover 100. The fastener 115 may be fastened at opening 148 through the triac 145 to engage nut 149, which may sit within a pocket 132 formed in spacer 130, for example. Opening 148 aligns with opening 117 in the top cover 110. The metal fastener 115 functions to draw the heat from the triac 145 and dissipate the heat through the top cover 110 functioning as a heat sink.

In an example, the triac 145 may be a single-isolated triac, where isolation is internal to the part. Additional isolation for the triac 145 may be provided by potting material within spacer 130. In addition to holding active components within control module 100 in place, the potting material may have a V0 flammability rating. Suitable potting materials include but are not limited to one or more of an epoxy-based encapsulant, a single or multi-component urethane or urethane gel encapsulant, a single or multi-component silicon or silicon gel encapsulant, etc.

Accordingly, having potting as an insulator distinguishes the control module 100 with a single layer of isolation versus a non-isolated control module, for example. Additionally, thermal grease may be applied to the top surface of triac 145; this is standard in the industry. In an alternative, a thermal pad (not shown) may be provided instead of the thermal grease. The thermal grease or thermal pad may be used to prevent the potting from seeping into the control module 100 and may be sized as a function of the triac 145 height, for example.

The top and bottom covers 110, 120 may therefore be secured together via a single fastener 115 such as a screw and nut assembly. In an example, a nut 149 sits within a recess or pocket 132 within the interior of the control module 100 so that the single screw extends through openings 117, 148 in the top cover 110 and triac 145 to engage the nut 149. This may provide a mechanism for heat transfer from the triac 145 to the top cover 110. Accordingly, any heat generated in the PCB 140 may be transferred through a potting (not shown) to the heat sink (i.e., top cover 110). In one example, the nut 149 may be an N3 nut that is captivated into a hexagonal shaped pocket or recess 132 formed in the spacer 130, as shown in FIG. 4A.

In an example, the bottom cover 120 may be made of a thermoplastic or other like material that complies with certain UL safety requirements. Exemplary plastic materials suitable for the bottom cover 120 have a V0 flammability rating and/or satisfy the UL 741 standard. Accordingly, any kind of plastic material that meets the flammability rating and/or which satisfies the UL 741 standard may be used for the bottom cover 120. For example, the bottom cover may be composed of a nylon 6-6 polyimide. The purpose of the bottom cover is to support control module 100 interior components and to permit potting so as to create a sealed enclosure. Additionally, the bottom cover 120 provides an area of electrical insulation for the triac 145.

As discussed above, the spacer 130 holds through-hole electronic components in place during assembly of the control module 100. During fabrication, there is a plurality of components on the PCB 140, such as the triac 145, shunt 147, resistors 142, etc. One function of the spacer 130 is to maintain components in place during wave soldering to eliminate hold down fixtures. Accordingly, the spacer 130 may be placed over the power tabs 150 during assembly to provide tolerances and also to provide electrical insulation while maintaining these tolerances between components.

The spacer 130 may be made of high-temperature plastic that is compatible with a wave soldering temperature. In an example, the spacer 130 may include snap-in fingers 135 to capture the PCB 140 so as to secure the through-hole electronic components to the PCB 140 prior to a wave-soldering process. A plurality of snap-in finger 135 may be provided on each side to releasably secure the spacer 130 to the PCB 140 via guide holes 141 in order to reduce manufacturing cost.

The spacer 130 includes a shroud portion 136 which mates onto a tab 122 of the bottom cover 120 so as to seal and enclose the input/output connector 160. The shroud portion 136 of spacer 130 may be designed to prevent debris and dust shavings from entering the control module 100's active components.

As discussed above, the spacer 130 may provide improved position tolerance controls of critical active power components including the power resistor 142, shunt 147, triac 145, quick connect power tabs 150 and input/output connector 160. The spacer 130 design may include plastic details 138 to align the quick connect power tabs 150, and a pocket/recess 132 to capture the nut 149. This enables a simple blind assembly between the triac 145 and the heat sink (top cover 110).

In one example, the spacer 130 design may reduce labor and material cost, and may help to ensure that the final PCB 140 assembly is compatible with a functional test system. The spacer 130 also provides electrical isolation and insulation for the assembled active components constituting the electronic assembly of the control module 100, facilitating a reduction in electronics assembly size by controlling positions of components on the PCB 140.

FIG. 5 is a perspective view of the control module to illustrate tracking insulation between the power tabs and mating terminal connectors of the power tool. In one example, an anti-tracking rubber closed-cell foam sheet 170 may be used to form an electrically insulating part used in power cable/cord connections between mating terminal connectors 172 and 174 of the power cable/cord 21 of the tool 10 and terminal fittings such as the quick-disconnect power tabs 150 and/or the male/female interfaces for input/output connector 160. The anti-tracking rubber closed-cell foam sheet 170 may seal the seams of a given terminal fitting housing and the control module 100 body when the mating connectors 172, 174 pushes the terminal fitting housing 172, 174 against the rubber closed-cell foam sheet 170 on the control module 100's body.

The rubber closed cell sheet 170 may make an air-tightened seal between the body of control module 100 and a given mating connector 172, 174 in a metal/dust environment. The rubber closed-cell foam sheet 170 may improve anti-tracking insulation between terminals for mating plugs (such as power tabs 150) during harsh metal dust environmental conditions, reduce the cost of the assembly of the control module 100 or a power tool 10 encompassing the control module 100, and may provide better control of the seal in the seams between terminals and/or mating quick-disconnect connectors, for example.

FIGS. 6A to 6F are views illustrating the relation between the shroud, pick-up coil and auxiliary board in accordance with an example embodiment of the present invention. FIGS. 6A to 6F illustrate the arrangement of the pick-up coil assembly 250 on the auxiliary board 200. FIGS. 6A to 6F do not illustrate the variable speed dial wheel 270 and other connections for purposes of clarity.

Figure 6A:
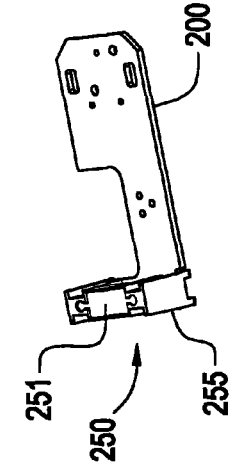
FIGS. 6A to 6F are views illustrating the relation between the shroud, pick-up coil and auxiliary board in accordance with an example embodiment of the present invention.
Figure 6B:
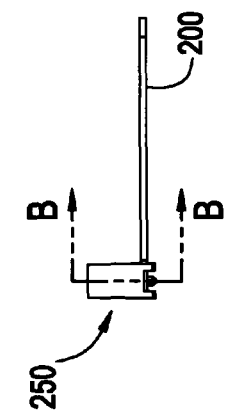
Figure 6C:
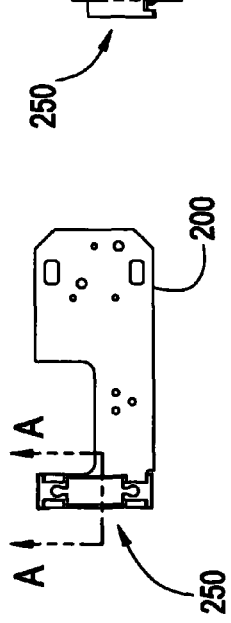
Figure 6D:
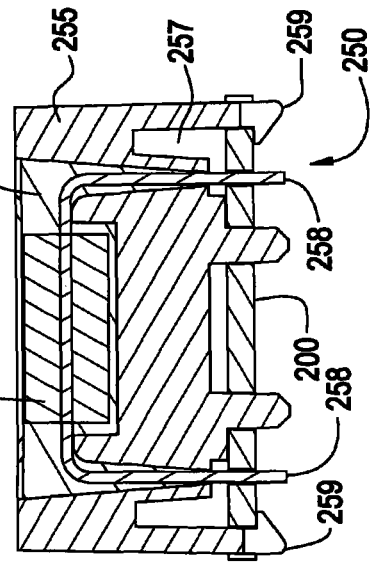
Figure 6E:
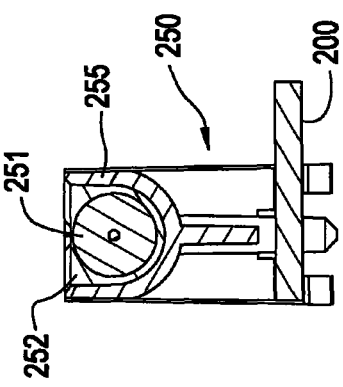
Figure 6F:
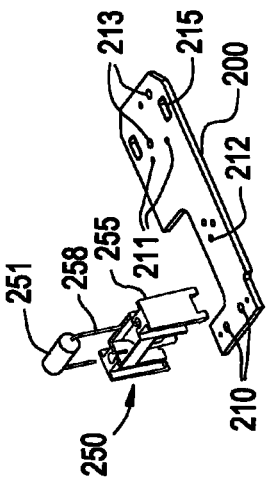

FIGS. 6A and 6B illustrate front and bottom views of the auxiliary board 200 and pick-up coil assembly 250. FIGS. 6C and 6D illustrate isometric and exploded isometric views of the pick-up coil assembly 250 and auxiliary board 200. FIG. 6E is a sectional view taken across line A-A of FIG. 6A, and FIG. 6F is a sectional view taken across line B-B of FIG. 6B.

In an example, the auxiliary board 200 may include the pick-up coil assembly 250 thereon. The auxiliary board 200 may be shaped to form fit to the contours of the interior of tool housing 18. The auxiliary board 200 is a PCB and may be made of a suitable substrate material such as silicon, a silicon oxide and/or another silicon-based structure, for example. The auxiliary board 200 may include a plurality of guide holes 210-213 and slots 215 to guide the leads 258 of the pick-up coil 251 (or signal leads 168 from a female connector 165, or wiper leads 277 of the variable speed dial wheel 270, not shown in FIG. 6) into the auxiliary board 200, as shown best in FIGS. 6D and 6F, for example.

The pick-up coil assembly 250 may include the pick-up coil 251 supported by a shroud 255. The shroud 255 is located at an end of the auxiliary board 200 in the vicinity of the motor armature 26, so as to elevate the pick-up coil 251 relative to the magnets on magnetic collar 22. The use of the shroud 255 may reduce vibration and/or prevent contamination from corrupting the accuracy or readings taken by the pick-up coil 251. The shroud 255 thus may act as a protectant or seal for the pick-up coil 251. In order to secure the shroud 255 thereon, the shroud 255 may be snapped firmly via fingers 259 around edges of the auxiliary board 200. As shown in FIG. 6F, a gap 257 may be provided for exerting a spring action on fingers 259 of the shroud 255.

The shroud 255 may be made of a suitable high-temperature material capable of withstanding soldering temperatures (up to about 300° C.) in a wave soldering process, for example. In an example, the shroud 255 may be composed of a 30% glass-filled nylon, which holds up without distortion during soldering the leads 258 to the auxiliary board 200. Thus, the shroud 255 may secure the pick-up coil 251 on the auxiliary board 200 before going through wave soldering, since the shroud 255 is composed of a high-temperature material that is compatible with a wave soldering temperature. The shroud 255 may be filled with any kind of epoxy potting 252 to protect the pick-up coil 251 from metal and/or dust contaminations.

Figure 7:
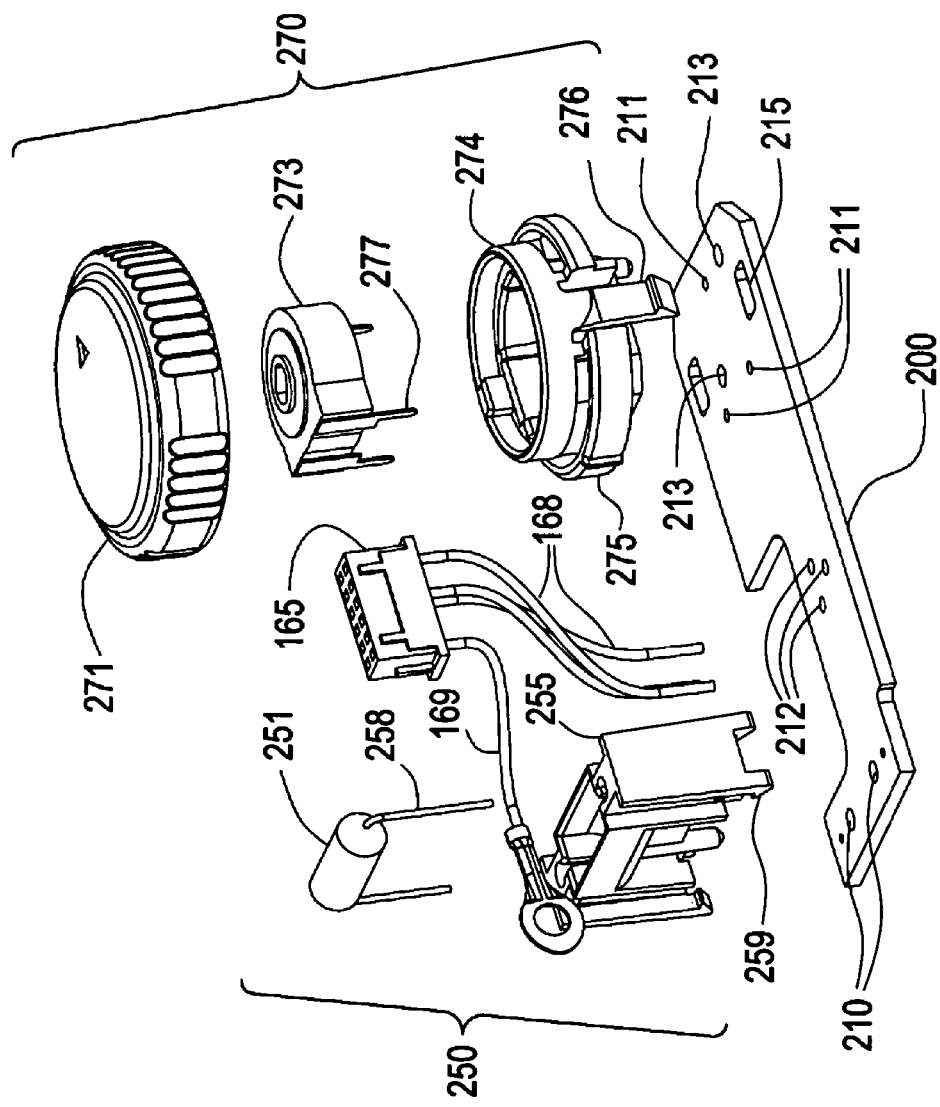
FIG. 7 is an exploded view illustrating the arrangement of pick-up coil, shroud, speed dial and female connector to the control module on the auxiliary board, in accordance with an example embodiment of the present invention.

FIG. 7 is an exploded view illustrating the arrangement of pick-up coil assembly, shroud, and variable speed dial wheel and female connector to the control module on the auxiliary board, in accordance with an example embodiment of the present invention. Referring to FIG. 7, the auxiliary board 200 also may include a variable speed dial wheel 270 serving as a potentiometer. The dial wheel 270 may include a knob 271, a potentiometer 273 operatively connected to a potentiometer cup 274 that includes a pair of leaf springs 275. The potentiometer 273 includes wiper leads 277 insertable into corresponding guide holes 211 of auxiliary board 200 for soldering to the board 200. A pair of snap-in fingers 276 of the pot cup 274 may engage the auxiliary board 200 through corresponding slots 215 to provide press-fit engagement of the pot cup 274 to the auxiliary board 200.

As shown in FIG. 7, a female connector 165 is provided for connective engagement to corresponding terminal pins of the input/output connector 160 so as to electrically connect the control module 100 to the auxiliary board 200. The female connector 165 includes a plurality of signal lines 168 and a hot wire 169 serving as the input power lead to the control module 100. The signal lines 168 may include a first signal line which provides a signal to the control module 100 based on a change of speed by the user actuating knob 271, a second signal line to measure the tachometer (pick-up coil 251) and a third ground plug signal line for the hot wire 169 in order to power up the circuit electronics (i.e., active components, microprocessor, etc.) in the control module 100. The signal lines 168 may be secured by solder at guide holes 212 to the auxiliary board 200.

FIG. 8 is an exploded isometric view illustrating the constituent components of the variable speed dial wheel in accordance with an example embodiment of the present invention. Referring to FIG. 8, the variable speed dial wheel 270 includes the knob 271, potentiometer 273 and potentiometer cup 274. Pot cup 274 is engaged to a support half ring 283, which includes a pair of leaf springs 275. Each leaf spring 275 includes a detent nose 282. The pot cup 274 includes a pair of alignment posts 284 receivable into corresponding guide holes 213 of the auxiliary board for soldering the pot cup to the board 200.

The knob 271 includes a face 272 to provide a speed indication and a plurality of raised details 278 on an outer circumferential surface thereof for finger grip by a user of the tool 10. A shaft 279 of the knob 271 may be press-fit into a corresponding aperture 281 of the potentiometer 273 for securing the knob 271 to the potentiometer 273.

The knob 271 includes a plurality of rigid detents 280 on an inner circumferential surface thereof, as shown in FIG. 8. In order to provide aural feedback to the user, the rigid detents 280 are designed to sit on points of the leaf spring 275. Engagement of the rigid detents 280 with the detent nose 282 on the leaf spring 275 provide a tactile feedback and also may prevent the knob 271 for inadvertent moving during tool 10 vibration. Additionally, the use of detents 280/282 may prevent the user from inadvertently changing speed, as it will provide a noticeable tactile feedback to the user.

Accordingly, as described hereinabove, an example embodiment of the present invention is directed to a control module assembly within a housing of a power tool for controlling operation of a motor of the tool. The assembly includes a control module having a top cover, a bottom cover, a PCB with control components thereon, and a spacer configurable between the top and bottom covers for providing tolerances for the control components. The assembly includes an auxiliary board in proximate relationship to the control module within the tool housing.

In an example, the spacer provides tolerances for the control components during a soldering process to fixedly attach the control components to the PCB, and auxiliary board is configured to support a pick-up coil assembly for sensing speed of a motor of the power tool. The pick-up coil assembly may include a pick-up coil for sensing speed of the tool motor, a shroud supporting the pick-up coil, and potting material within the shroud that encloses the pick-up coil. The pick-up coil includes a plurality of leads extending through the potting material and shroud for connection to the auxiliary board.

The shroud includes a pair of fingers enabling a snap-fit connection of the shroud to edges of the auxiliary board, and a plurality of gaps for enabling a spring action to be applied to the fingers. The shroud may be composed of a high-temperature material configured to withstanding soldering temperatures of up to about 300° C. without distortion. In an example, the shroud is composed of a 30% glass-filled nylon.

The auxiliary board supports a variable speed dial wheel for adjusting speed of a motor of the tool. The dial wheel includes a rotatable knob, a potentiometer operatively connected to the knob, and a potentiometer cup for supporting the potentiometer. The rotatable knob includes a face on an outer circumferential surface thereof to provide a speed indication, and a plurality of raised details on the outer circumferential surface for finger grip engagement by a user of the tool.

The potentiometer includes a central aperture for snap-fit engagement with a central shaft of the knob, and a plurality of rigid detents on an interior circumferential surface thereof to engage a given detent nose on a given leaf spring so as to provide tactile feedback to a user actuating the knob. The potentiometer includes multiple wiper leads insertable into corresponding guide holes of the auxiliary board. The potentiometer cup includes a pair of leaf springs, each leaf spring having a detent nose protruding from a surface thereof. The potentiometer cup includes a pair of snap-in fingers to engage the auxiliary board through corresponding slots to provide press-fit engagement of the potentiometer cup to the auxiliary board.

The assembly may further include a female connector for connective engagement to corresponding terminal pins of an input/output connector of the control module so as to electrically connect the control module to the auxiliary board. The female connector includes multiple signal lines and a hot wire serving as an input power lead to the control module. In one example, the signal lines a first signal line to provide a signal to the control module based on a change of speed by a user actuating the knob, a second signal line to measure a sensed signal from the pick-up coil, and a third ground plug signal line for the hot wire in order to power up control components within the control module.

Accordingly, as described hereinabove, in another example the pick-up coil assembly may be arranged on a circuit board (auxiliary board) attached to and external to the control module within the tool housing of the power tool, for controlling operation of a motor of the tool. The pick-up coil assembly includes a pick-up coil for sensing speed of the tool motor, a shroud supporting the pick-up coil, and potting material within the shroud that encloses the pick-up coil. The pick-up coil includes a plurality of leads extending through the potting material and shroud for connection to the auxiliary board.

The shroud is located at an end of the auxiliary board in the vicinity of the motor armature of the motor, so as to elevate the pick-up coil relative to a plurality of magnets on the armature. The shroud includes a pair of fingers enabling a snap-fit connection of the shroud to edges of the auxiliary board, and multiple gaps for enabling a spring action to be applied to the fingers. In an example, the shroud may be composed of a high-temperature material configured to withstanding soldering temperatures of up to about 300° C. without distortion, such as a 30% glass-filled nylon.

In another described example, a variable speed dial wheel for adjusting speed of a motor of a power tool is arranged on a circuit board (auxiliary board) that is connected to and external to the control module within the power tool housing. The dial wheel includes a rotatable knob, a potentiometer operatively connected to the knob and a potentiometer cup for supporting the potentiometer.

The rotatable knob includes a face on an outer circumferential surface thereof to provide a speed indication and a plurality of raised details on the outer circumferential surface for finger grip engagement by a user of the tool. The rotatable knob also may include a plurality of rigid detents on an interior circumferential surface thereof to engage a given detent nose on a given leaf spring so as to provide tactile feedback to a user actuating the knob.

The potentiometer includes a central aperture for snap-fit engagement with a central shaft of the knob, and a plurality of wiper leads insertable into corresponding guide holes of the auxiliary board.

The potentiometer cup includes a pair of leaf springs, each leaf spring having a detent nose protruding from a surface thereof. The potentiometer cup includes a pair of snap-in fingers to engage the auxiliary board through corresponding slots to provide press-fit engagement of the potentiometer cup to the auxiliary board. The potentiometer cup includes a pair of alignment posts receivable in corresponding guide holes of the auxiliary board for securing the potentiometer cup to the auxiliary board.

Figure 9A:
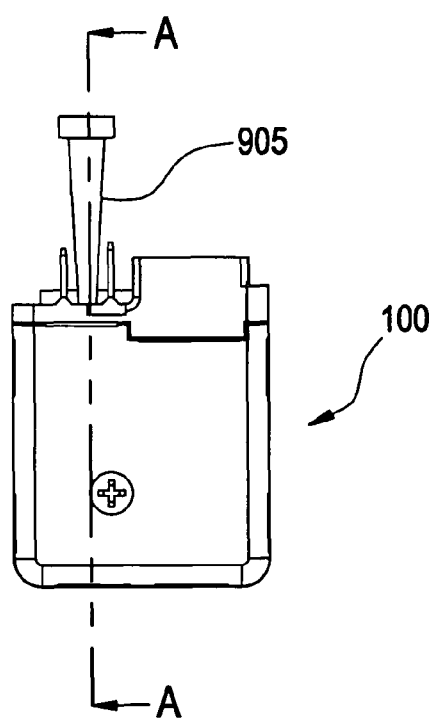
FIG. 9A is a top view of the control module illustrating the relation of a potting nozzle to inject potting fill within the control module.
Figure 9B:
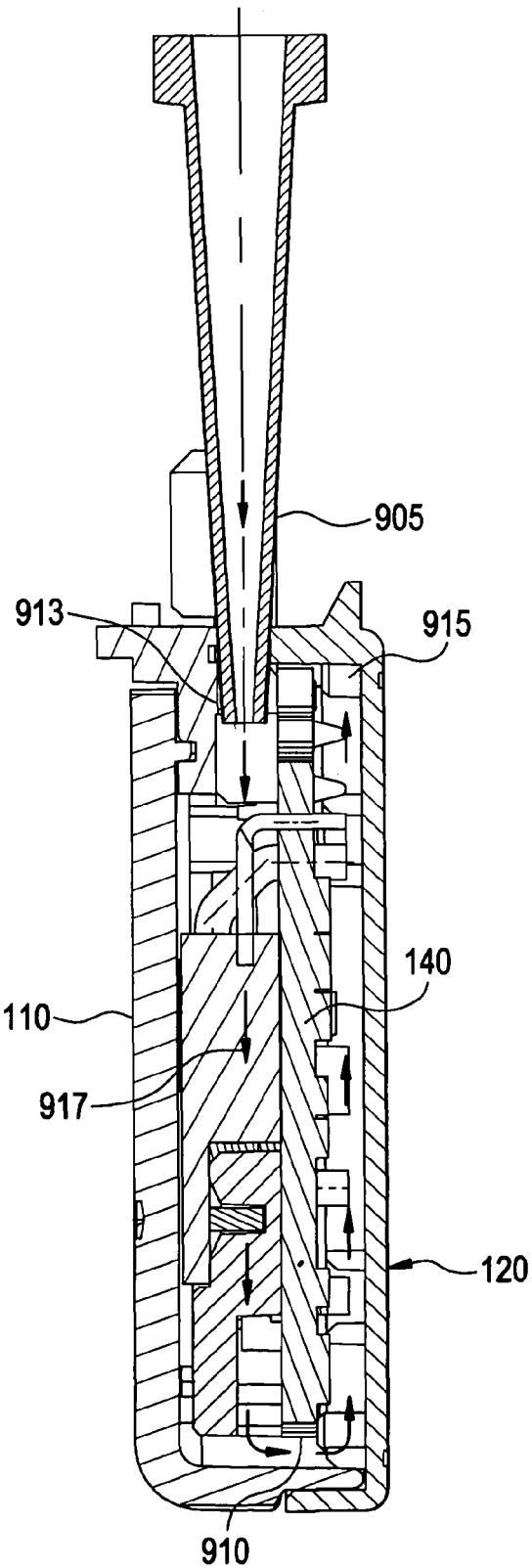
FIG. 9B is a cross-section along line A-A of FIG. 9A to illustrate the direction of potting fill in accordance with an example embodiment of the present invention.

FIG. 9A is a top view of the control module illustrating the relation of a potting nozzle to inject potting fill within the control module, and FIG. 9B is a cross-section along line A-A of FIG. 9A to illustrate the direction of potting fill in accordance with an example embodiment of the present invention.

The control module 100 should be capable of withstanding substantial shock and vibration, dirt and moisture. The control module 100 also should be compact, robust and potted to enable the module to fit within the power tool's pocket. Potting or embedment is the covering of an electronic, printed circuit board, or electrical device to protect it from the surrounding environment, such as protection from moisture and/or to electrically insulate the device to operate as designed.

An improper potting process within the module 100 could cause one or more air pockets to be formed within the potting of the module. This could result in the module 100 failing high voltage insulation tests to meet certain safety compliance requirements.

Referring to FIGS. 9A and 9B, in an effort to avoid the formation of air pockets within the potting of the module, a pressurized potting process may be used to inject potting fill into the module 100. This may be done by having two open ports or holes, an intake port 913 between the top cover 110 and bottom cover 120 which receives the potting nozzle 905, and an exhaust air vent port 915 formed in the bottom cover 120. The holes 913, 915 enable a potting flow direction 917 (see arrows) around PCB 140 to be controlled so as to push air out of the module 100.

Accordingly, configuring an essentially closed module 100 with two open ports 913, 915 permits the flow control of potting fill in one direction. One port 913 is for the intake of the pressurized potting shot, and the other vent port 915 is to exhaust air until the potting material become visible in the vent port 915 to indicate the completion of the potting injection process within module 100. As shown best in FIG. 9B, this arrangement provides one direction 917 of potting fill from the intake port 913 to fill the top side of the PCB 140 within top cover 110, through the notch 910 at a bottom edge of the PCB 140 to allow potting to fill up the underside of the PCB 140 until potting reaches the vent port 915.

The above-described potting fill process thus pushes air in one direction 917 from the intake port 913 to the vent port 915 so as to completely fill the module 100 with potting material, so as to avoid the formation of air pockets therein. The intake port 913 diameter is small enough to allow the pressurized potting nozzle 905 to seat and be sealed at the intake port 913. The smaller diameter vent port 917 hole allows air to be exhausted quickly in an effort to improve control of the potting fill process within the module 100.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed is:

1. A control module within a housing of a power tool, the module comprising:
a top cover,
a bottom cover,
a printed circuit board (PCB) with control components thereon, and
a spacer configured between the top and bottom covers for providing tolerances for the control components,
an input/output connector having multiple terminal pins for providing power and data to the module,
wherein the spacer includes a shroud portion which mates to a tab on the bottom cover to sealingly enclose the input/output connector,
fastening means for securing the top cover to the bottom cover,
wherein the fastening means includes:
a threaded fastener insertable through a single hole in the top cover and through an aligned hole in a power device within the module, to be engaged to a nut, wherein the nut is situated in a formed recess in the spacer and beneath the power device.

2. The control module of claim 1, wherein the control components include one or more of a power resistor, a triac, a shunt and a microcontroller.

3. The control module of claim 2, wherein the bottom cover provides electrical insulation for the triac.

4. The control module of claim 1, where the top cover serves as a heat sink.

5. The control module of claim 1, further comprising:
a pair of quick-connect power tabs.

6. The control module of claim 5, wherein the power tabs have differing size and length.

7. The control module of claim 1, wherein the threaded fastener serves to draw heat from the power device and dissipate the heat through the top cover.

8. The control module of claim 1, further comprising:
potting material provided within the spacer for holding the control components in place and for providing a single layer of insulation for the control module.

9. The control module of claim 8, wherein the potting material is injected into the module so as to avoid formation of air pockets therein.

10. The control module of claim 8, wherein the potting material has a V0 flammability rating.

11. The control module of claim 1, wherein the top cover is a metal selected from a group comprising copper, aluminum, stainless steel, zinc (ZA8) and zinc aluminum alloy.

12. The control module of claim 1, wherein the bottom cover is composed of a thermoplastic or other plastic material which has a V0 flammability rating and satisfies the UL 741 standard.

13. The control module of claim 1, wherein the bottom cover is composed of a nylon 6-6 polyimide.

14. The control module of claim 1, wherein the module is electrically connectable to an auxiliary board within the tool housing.

15. The control module of claim 1, wherein the spacer is attached to the PCB for providing tolerances for the control components during a soldering process to fixedly attach the control components to the PCB.

16. A control module within a housing of a power tool, the module comprising:
- a top cover,
- a bottom cover,
- a printed circuit board (PCB) with control components thereon,
- a spacer configured between the top and bottom covers for providing tolerances for the control components,
- an input/output connector having a multiple terminal pins for providing power and data to the module,
- wherein an auxiliary board supports a pick-up coil assembly for sensing speed of a tool motor, a variable speed dial wheel for adjusting speed of the tool motor, and having a plurality of signal leads of a female connector to provide power and data to the control module via the input/output connector.

17. A power tool, comprising:
- a tool housing,
- a tool motor,
- a tool working accessory powered by the tool motor, and
- a control module for controlling the tool motor operation, the control module including:
  - a top cover,
  - a bottom cover,
  - a printed circuit board (PCB) with control components thereon,
- a spacer configured between the top and bottom covers for providing tolerances for the control components,
- an auxiliary board within the tool housing that is connected to the control module therein,
- the auxiliary board supports a pick-up coil assembly for sensing speed of the tool motor, a variable speed dial wheel for adjusting speed of the tool motor, and
- the auxiliary board having a plurality of signal leads of a female connector to provide power and data to the control module via an input/output connector.

\* \* \* \* \*